United States Patent [19]

Taguchi

[11] Patent Number: 5,694,627
[45] Date of Patent: Dec. 2, 1997

[54] LENS SHUTTER TYPE OF CAMERA WITH A RETRACTABLE STROBE

[75] Inventor: Ichiro Taguchi, Tokyo, Japan

[73] Assignee: Asahi Kogaku Kogyo Kabushiki Kaisha, Tokyo, Japan

[21] Appl. No.: 636,501

[22] Filed: Apr. 23, 1996

[30] Foreign Application Priority Data

Apr. 24, 1995 [JP] Japan ................................ 7-123179

[51] Int. Cl.⁶ .................................................. G03B 15/03
[52] U.S. Cl. ........................ 396/175; 396/176; 396/177
[58] Field of Search .......................... 354/149.1, 149.11, 354/195.1, 195.12; 396/155, 175, 176, 177, 178, 85

[56] References Cited

U.S. PATENT DOCUMENTS

| | | | |
|---|---|---|---|
| 4,166,681 | 9/1979 | Imura et al. | 354/149 |
| 4,462,666 | 7/1984 | Olban | 354/126 |
| 4,589,747 | 5/1986 | Nakayama et al. | 354/149.11 |
| 4,653,883 | 3/1987 | Maeno | 354/149.11 |
| 4,847,647 | 7/1989 | Ueda | 354/149.1 |
| 4,916,475 | 4/1990 | Hori | 354/149.1 |
| 4,951,074 | 8/1990 | Ueda | 354/149.1 |
| 5,012,262 | 4/1991 | Mogamiya et al. | 354/149.1 |
| 5,036,345 | 7/1991 | Kawano | 354/126 |
| 5,083,146 | 1/1992 | Ueda | 354/149.1 |
| 5,280,315 | 1/1994 | Nomura et al. | 354/149.11 |
| 5,280,316 | 1/1994 | Fukahori et al. | 354/149.11 |
| 5,410,379 | 4/1995 | Hirohata | 354/149.1 |

FOREIGN PATENT DOCUMENTS

| | | |
|---|---|---|
| 54-50324 | 9/1977 | Japan . |
| 64-57249 | 8/1987 | Japan . |
| 64-6456427 | 8/1987 | Japan . |
| 2120395 | 5/1983 | United Kingdom . |
| 2186705 | 6/1986 | United Kingdom . |
| 2223598 | 9/1989 | United Kingdom . |
| 2225870 | 12/1989 | United Kingdom . |
| 2235054 | 7/1990 | United Kingdom . |

Primary Examiner—Eddie C. Lee
Attorney, Agent, or Firm—Greenblum & Bernstein P.L.C.

[57] ABSTRACT

A lens shutter type of camera with a retractable strobe device has a rectangular camera body with one side longer than the other. A mechanism pops the retractable strobe out from the shorter side of the camera body to an operative position. A mechanism varies an illuminating angle of the retractable strobe device in accordance with a zooming operation of a zoom photographing lens when the strobe device is in the operative position. The popping out mechanism and the illuminating angle varying mechanism are arranged such that the retractable strobe device pops out from the shorter side surface of the camera.

16 Claims, 5 Drawing Sheets

(a)

(b)

LENS SHUTTER TYPE OF CAMERA WITH A RETRACTABLE STROBE

BACKGROUND OF THE INVENTION

1. Field of the Invention

The present invention relates to a camera with a retractable strobe, in particular, to a compact camera having a retractable strobe.

2. Description of Related Art

In a recent compact camera having a strobe, a strobe device is retractably installed in a camera body to enhance compactness and portability. On the other hand, along with a camera body being made smaller, a strobe device is also made smaller, which inevitably limits strobe performance. Due to a strobe device being made smaller, an amount of light emitted is limited, so that it is difficult to obtain a longer photographing distance with sufficient strobe light. To compensate for such a disadvantage of a strobe device, attempts have been made to extend a photographing distance by controlling a converging direction of light emitted from a strobe device. Specifically, the light emitting portion of a strobe is movable according to a change of focal length of a photographing lens, which is know as a zoom strobe. In a zoom strobe, an illuminating angle of the strobe light can be made narrower, so that an effective guide number (GNo.) is increased to extend a photographing distance. The guide number is generally defined by the formula: GNo.=F×d, wherein F represents an effective F number at an appropriate exposure condition; and "d" represents an illuminating distance (an object distance). The features of the compact camera mentioned above are usually applied in a lens shutter type of camera, in which a shutter device is provided between the lenses, and a finder optical system and a photographing optical system are separately provided.

zoom strobe of the prior art, a guide number is changed by moving a light source, lenses and so forth installed in the strobe device. However, when a strobe device is retractable, a mechanism for changing a guide number inevitably becomes complicated. Consequently, provision of a retractable zoom strobe in a compact camera manufactured for the purpose of attracting consumers with lightweight and thin-body size has been hampered.

As already recognized in a compact camera in a prior art, a strobe device is retractably provided on the upper surface of a camera body. According to this arrangement, a distance between the strobe device and a photographing lens is short enough to cause the red-eye phenomenon (or red-eye effect). When a picture of person staring at the camera is taken with a larger guide number of the strobe device, his/her eyes are likely to appear red in the photograph.

SUMMARY OF THE INVENTION

The main object of the present invention is to provide a camera with a strobe device, which can prevent the red-eye phenomenon.

Another object of the present invention is to provide a non-complicated zoom strobe device, which can be installed in a compact camera.

To achieve the objective, according to an aspect of the present invention, there is provided a lens shutter type of camera with a retractable strobe device. The camera comprises a camera body formed as a rectangular solid shape having longer side surfaces and shorter side surfaces. A mechanism for popping-up the retractable strobe from the camera body so that the strobe device is in an operative position and a mechanism for varying an illuminating angle of the retractable strobe device in accordance with a zooming operation of a zoom photographing lens when the strobe device is in the operative condition are provided. The popping-out mechanism and the illuminating angle varying mechanism are arranged so that the retractable strobe device pops-out from one of shorter side surfaces of the rectangular solid shape body of the camera.

The present disclosure relates to the subject matter contained in Japanese patent application No. 7-123179 (filed on Apr. 24, 1995), which is expressly incorporated herein by reference in its entirety.

DESCRIPTION OF THE PREFERRED EMBODIMENT

Figure 1:
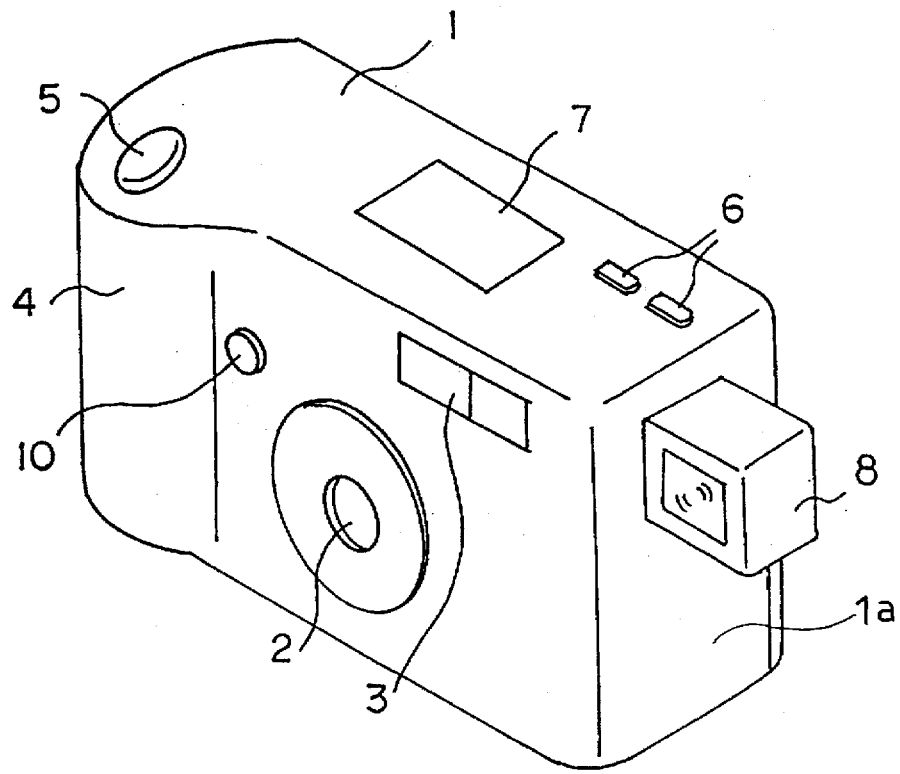
FIG. 1A is a perspective view from the front side of a compact camera from which a strobe device is popped up according to an embodiment of the present invention.
FIG. 1B is a perspective view from the backside of the compact camera into which the strobe device is retracted according to the embodiment of the present invention.
Figure 1:
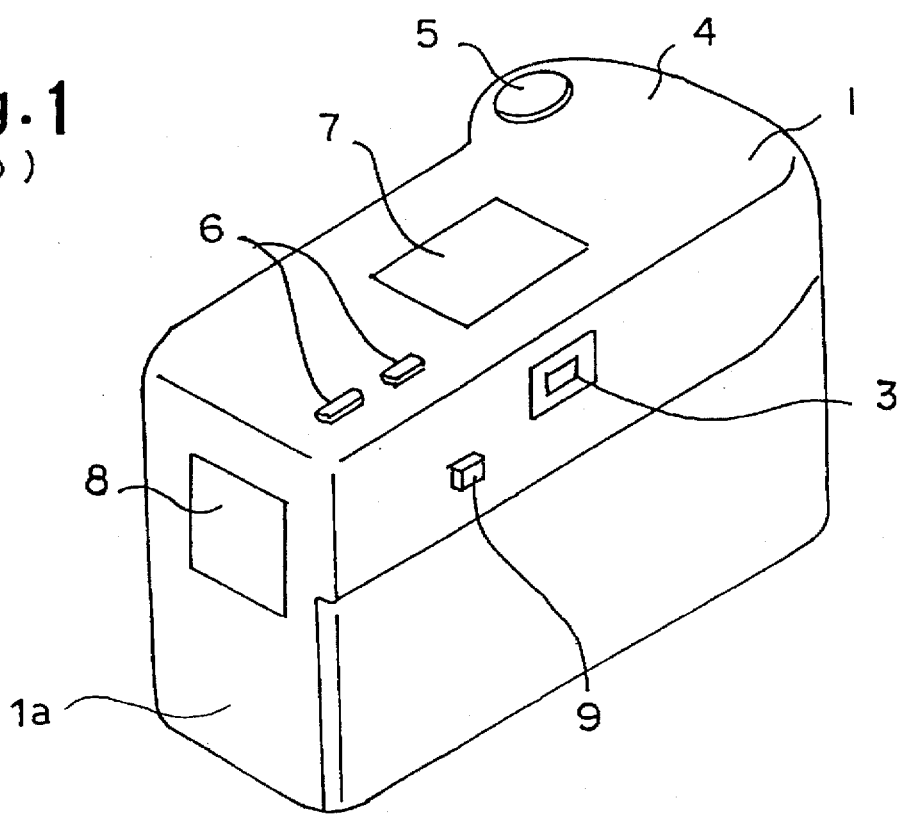

A preferred embodiment according to the present invention will be explained with respect to FIG. 1A and FIG. 1B. The drawings show a compact camera to which the present invention is applied. In this embodiment, the compact camera is shown, e.g., as a lens shutter type of camera, in which a shutter device is provided between the lenses. A finder optical system and a photographing optical system are separately provided. FIG. 1A is a front perspective view of a camera body 1 of the compact camera with a strobe 8 being popped out. FIG. 1B is a back perspective view of the camera body 1 with strobe 8 retracted. As shown in these drawings, the camera body 1 has a rectangular solid body, which includes a front surface, a back surface, longer side upper and lower surfaces, and shorter side right and left surfaces. On the center area of the front surface, a zoom photographing lens 2 is provided. A finder 3 is provided above lens 2. As shown in FIG. 1A, a grip portion 4 is provided on the left side of the front surface. A shutter release button 5 is provided on the longer side upper surface 1. Also on the longer side upper surface, various switches and indicating devices, such as function switches 6 and an indicator 7 are provided. At the shorter side right surface 1a of the camera body 1, a strobe 8, which is arranged to pop-out in the right hand direction from the right side surface 1a is provided in FIG. 1A. In comparison with a prior art camera in which a strobe is arranged to pop-up in a normal direction with respect to the longer side upper surface of the camera body, the strobe 8 is arranged to pop-out in the normal direction with respect to the vertical surface 1a. When not used, the strobe 8 is retracted in the camera body 1. When a photographer uses the strobe 8, he/she operates a main switch button 9 (see FIG. 1B) provided on a back surface of the camera body 1. According to this embodiment, the main switch button 9 is arranged to electrically activate a main system of the camera (not shown) for controlling the overall operations. Thus, when the main switch button 9 is operated, the strobe 8 mechanically pops out while the main system is activated. In addition, the zoom photographing lens 2 is operated by a zoom button 10, which is provided on the front surface of the camera body 1, to change focal length.

Figure 2:
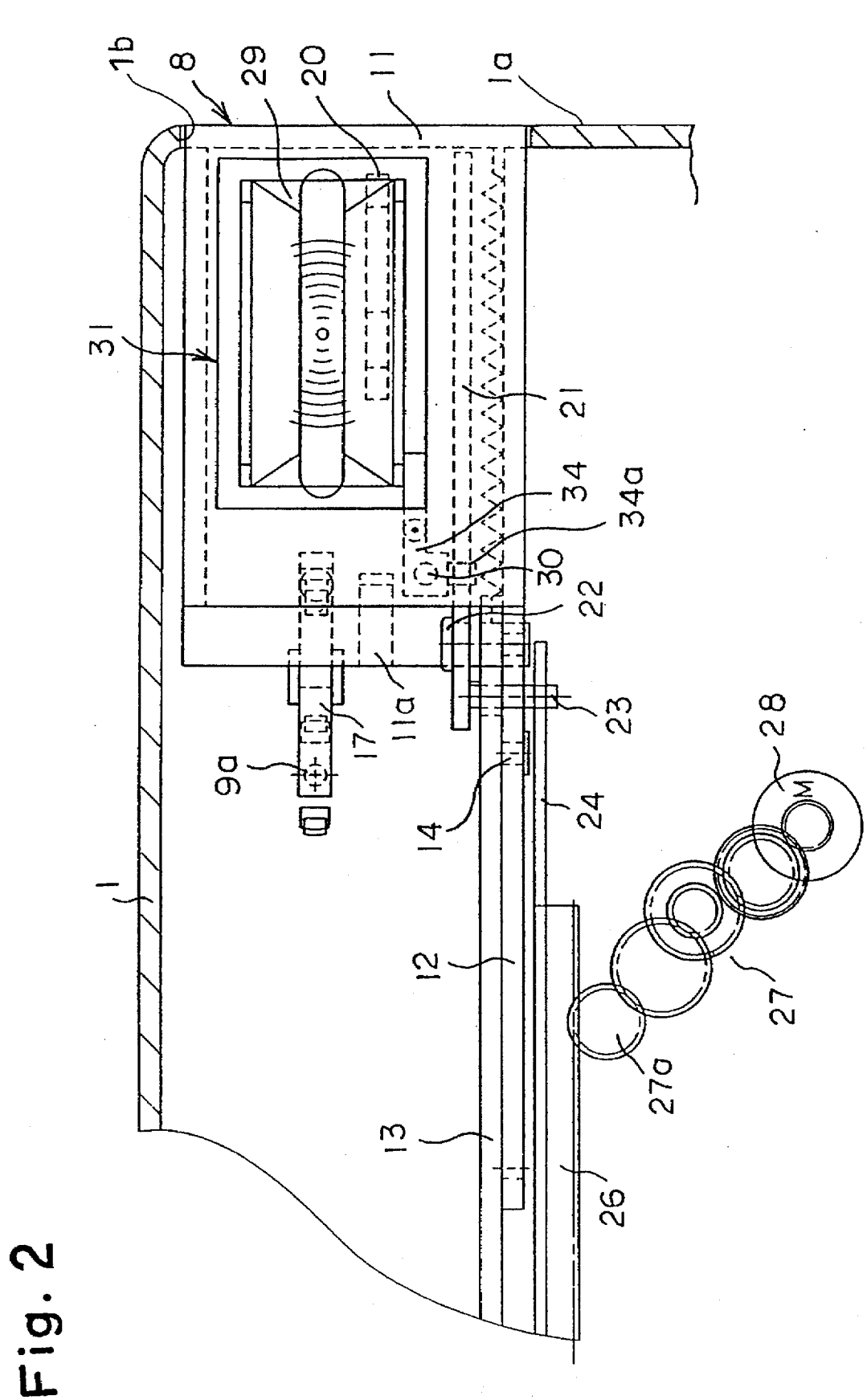
FIG. 2 is a partial front view of the camera structure in the vicinity of the strobe device, which is retracted into the camera body.
Figure 3:
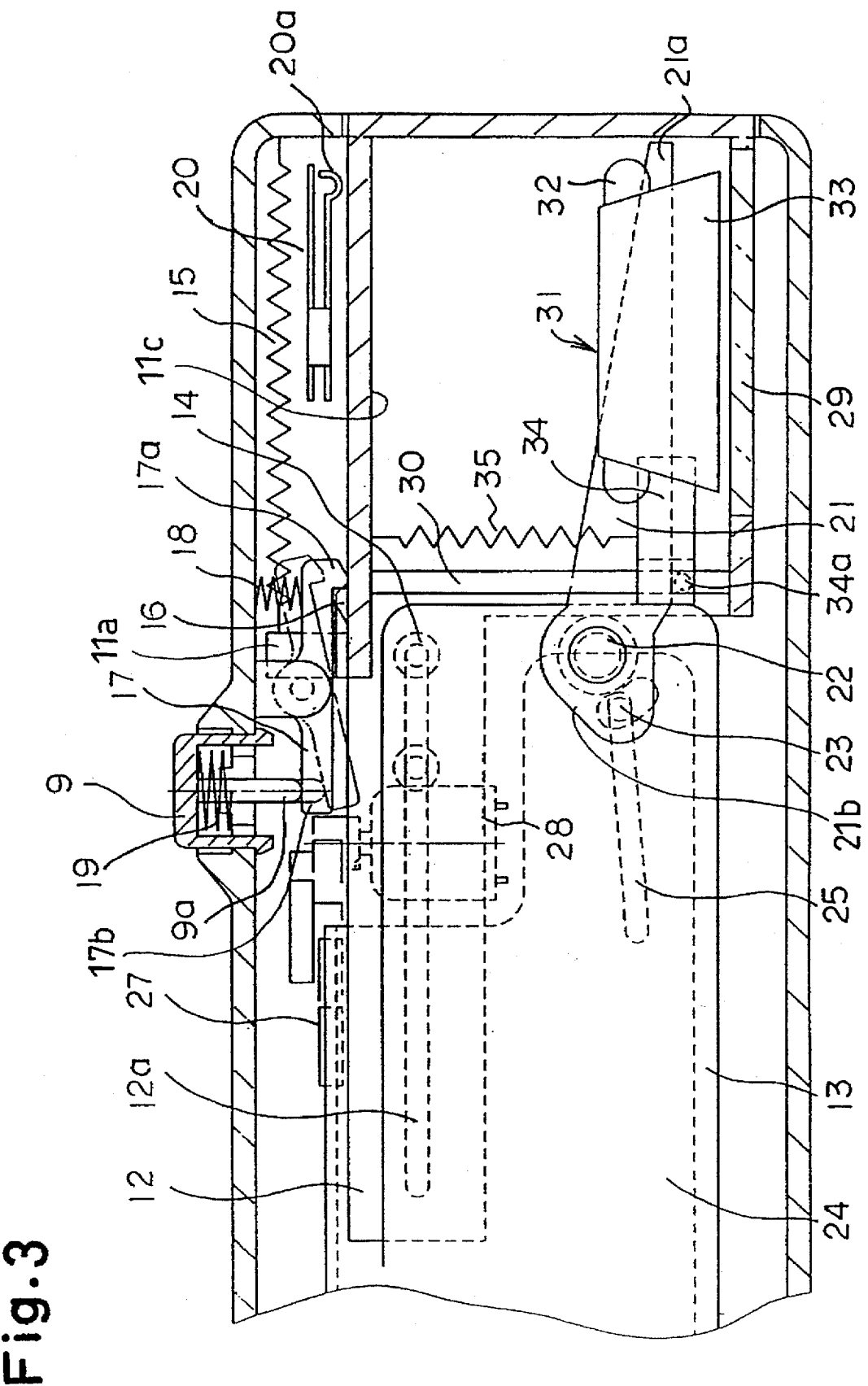
FIG. 3 is a plane view of the structure shown in FIG. 2.

FIG. 2 is a partial front view of the structure of the camera in the vicinity of the strobe 8, which is retracted in the camera body 1. FIG. 3 is a plane view of the structure shown in FIG. 2. On the shorter side right surface 1a of the camera body 1, there is provided an opening 1b through which the strobe 8 is inserted. The strobe 8 comprises a casing 11 in which a light emitting device (to be explained) is contained. On the bottom of the casing 11 as shown in FIG. 2, a supporting plate 12 is integrally provided with the casing 11. The supporting plate 12 is formed to extend to the left side direction (i.e., toward the inside of the camera body) from the casing 11. A a base plate 13 is disposed over the supporting plate 12. The base plate 13 is fixed to a predetermined fixed portion of the camera body 1. Two pins 14 are integrally formed on the base plate 13. The pins 14 are loosely inserted into a groove 12a formed on the supporting plate 12, so that the casing 11 together with the supporting plate 12 can be movable in a pop-out direction and a retracting direction along the groove 12a. As shown in FIG. 3, a tension spring 15 is provided between the casing 11 and a predetermined portion of the camera body 1 so that the casing 11 is constantly biassed toward the pop-out direction.

FIG. 3 is a plane view of the structure shown in FIG. 2. A protrusion 16 is formed on the casing 11. A lever member 17, which engages the protrusion 16, is provided on a predetermined portion in the camera body 1. The lever member 17 pivots about a bracket member formed on the predetermined portion in the camera body 1. The lever member 17 comprises a hook portion 17a on the right end side of lever member 17. The hook portion 17a selectively engages the protrusion 16. Furthermore, the hook portion 17a is constantly biassed by a compression spring 18 disposed between the camera body 1 and the hook portion 17a. One end of the compression spring 18 is fixed on a predetermined portion in the camera body 1 by a known manner, and the other end of the compression spring 18 is fixed on the upper surface area of the hook portion 17a by a known manner. According to this structure, the casing 11 is held in the retracted position due to the engagement of the protrusion 16 and the hook portion 17a, which is being pressed by the compression spring 18. The range of movement of the lever member 17 is shown in the dotted line in FIG. 3. The other end of the lever member 17 is formed as the end portion 17b, which corresponds to the location main switch button 9. The main switch button 9 includes a shaft 9a and a compression spring 19. In a free state of the main switch button 9, the shaft 9a stays as shown in the solid line, so that the lever member 17 stays as shown in the solid line i.e., button 9 and shaft 9a are in an upper position, and lever 17 is engaged with protrusion 16. When the main switch button 9 is pressed against the biasing force of the compression spring 19, the bottom of the shaft 9a hits the end portion 17b of the lever member 17. As a result of this motion, the entire lever member 17 rotates in counterclockwise direction so that the hook portion 17a disengages the protrusion 16. According to this disengaging motion, the casing 11 moves to the pop-up position due to the biasing force of the tension spring 15. The main switch button 9 also serves as the main power switch for the entire camera operation system. the camera system, a contact 20 acts as a power switch, and includes a movable contact 20a. Corresponding to the movable contact 20a, a pin member 11a is formed on the casing 11. The the pin member 11a is disposed on a predetermined portion on a backside panel 11c of the casing 11. The contact 20 is disposed on a predetermined fixed portion in the camera body 1 to correspond to the location of the pin 11a. When the casing 11 moves to the pop-up position by disengaging the hook portion 17a, the pin member 11a comes into contact with the movable contact 20a to activate the entire camera.

Figure 4:
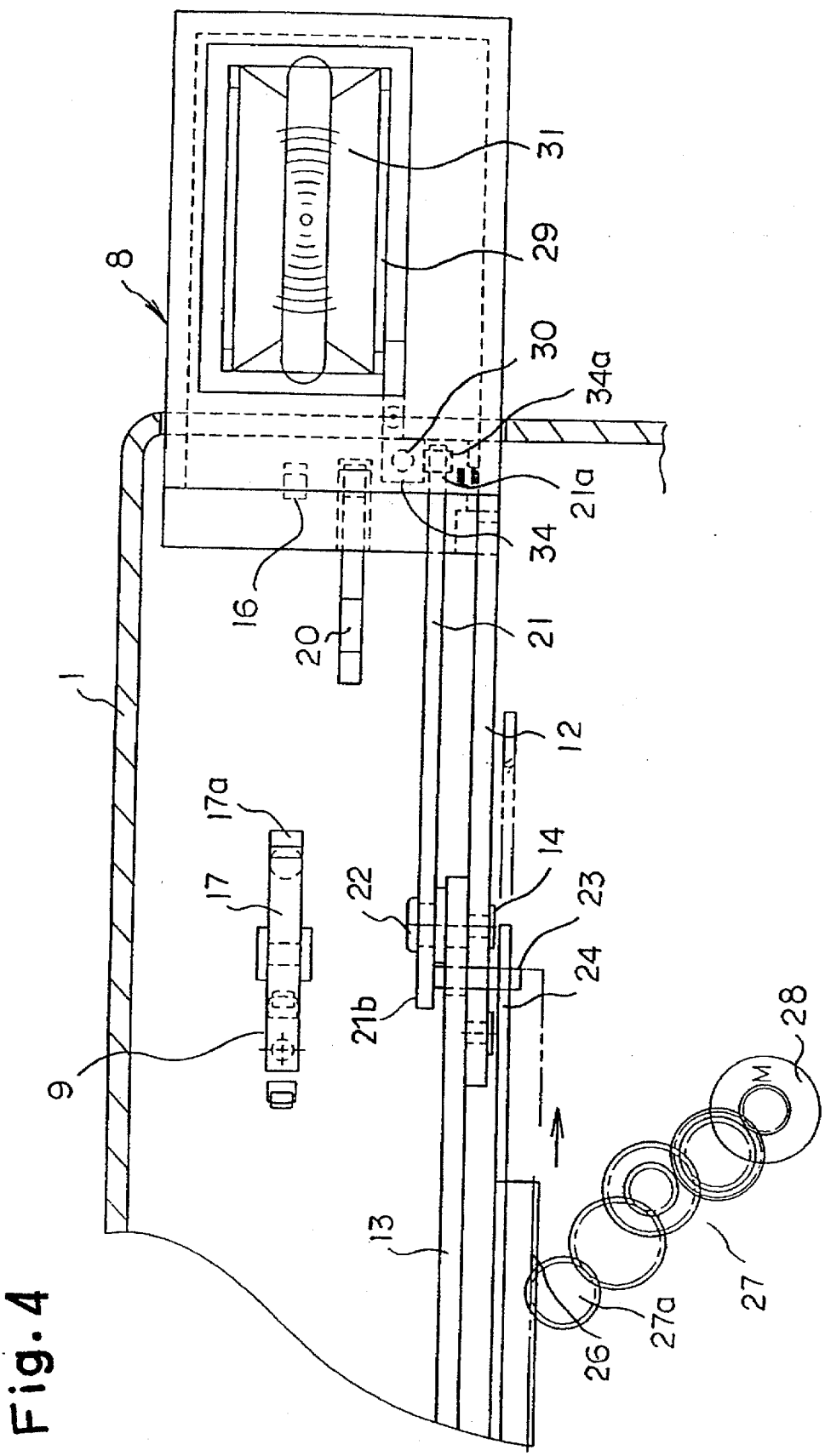
FIG. 4 is a partial front view of the camera structure in the vicinity of the strobe device, which is popped up from the camera body.

On the base plate 13, a shaft 22 is provided in the vicinity of the casing 11. A zoom lever 21 is rotatably supported around the shaft 22. The zoom lever 21, as shown in FIG. 3, is rotatable in the horizontal plane, and an end portion 21a (explained below) can be arranged to engage a bracket of a light emitting portion (explained below) of the strobe 8. On the other hand, at an opposing end portion 21b, a pin 23, facing the base plate 13, is provided on the surface of the zoom lever 21. In other words, the pin 23 is downwardly disposed as shown in FIG. 2. To receive the pin 23, a zoom cam plate 24 is movably supported in the camera body 1. A cam groove 25 is formed on the zoom cam plate 24, as shown in FIG. 3. The pin 23 movably engages the cam groove 25. For the zoom cam plate 24, a supporting structure (not shown), which is similar to that of the supporting plate 12, is employed. In other words, the pin 14 is formed on the base plate 13, and a corresponding groove is formed parallel with the moving direction of the strobe 8 so that the zoom cam plate 24 can move reciprocally along the strobe moving direction. At a predetermined portion of the zoom cam plate 24, a rack 26 is integrally formed with the zoom cam plate 24. The rack 26 (see FIG. 4) is arranged to mesh with a final gear 27a of a reduction gear mechanism 27. More specifically, as shown in FIG. 4, a zoom motor 28 is provided, and the reduction gear mechanism 27 is arranged to connect the motor 28 and the rack 26. Furthermore, the reduction gear mechanism 27 is connected to a zooming mechanism (not shown), so that the rack 26 (the zoom cam plate 24) moves synchronously with the zoom photographing lens 2.

Figure 5:
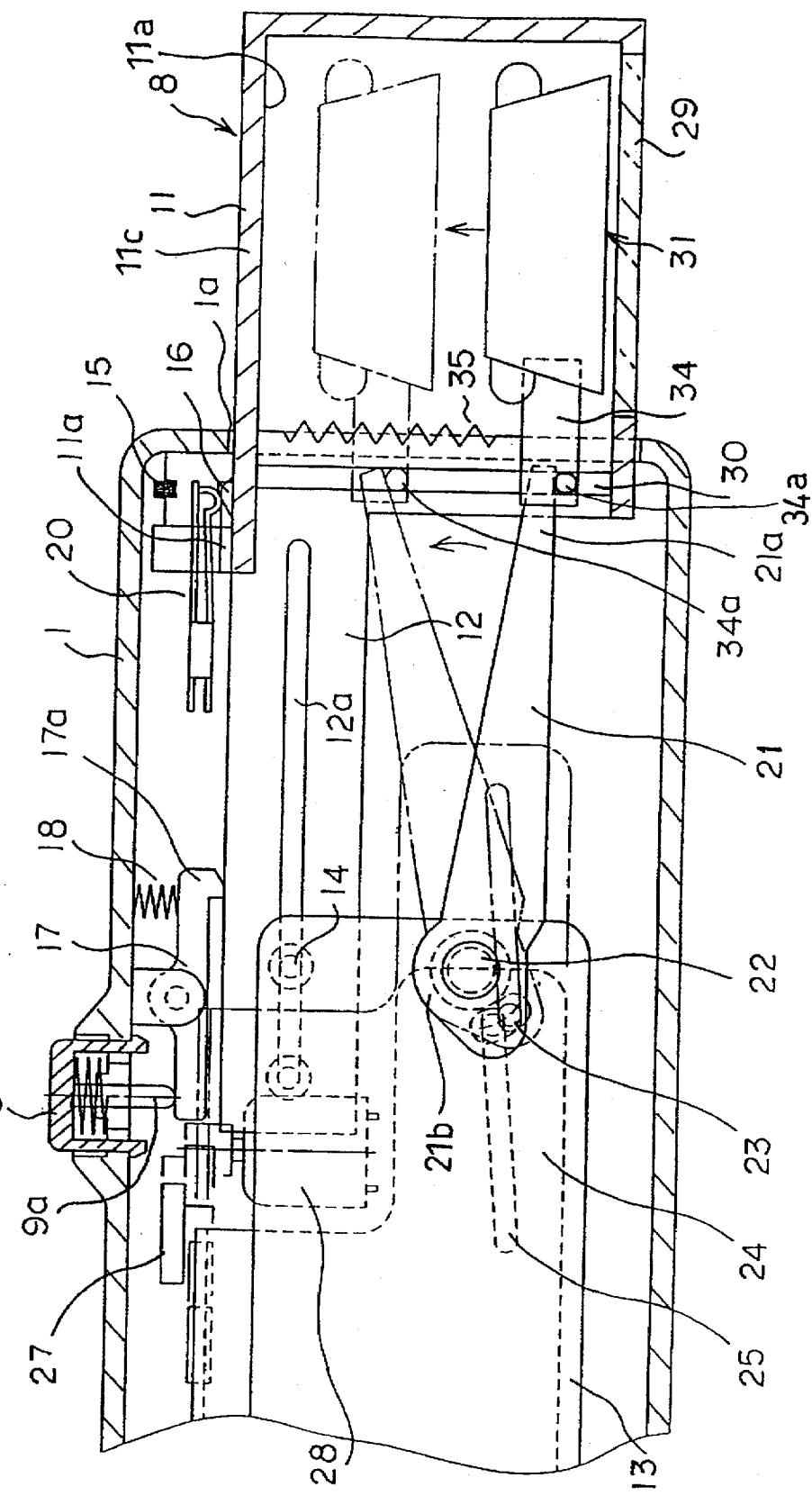
FIG. 5 is a plane view of the structure shown in FIG. 4.

Details on the strobe 8 are explained according to FIGS. 4 and 5. On a front opening of the casing 11, there is fixedly provided a Fresnel lens 29. In the casing 11, from the front to rear direction, which is parallel with the optical axis of the photographing lens 2, a guide rail 30 is provided. On the guide rail 30, a light emitting portion 31 is movably supported. The light emitting portion 31 comprises a light source 32, such as a xenon tube or the like, and a reflecting hood 33. The light emitting portion 31 is fixed on a bracket 34 to which the guide rail 30 in inserted. According to this structure, the light emitting portion 30 (the bracket 34), in the casing 11, can move in accordance with the movement of the zoom lever 21 in the front and rear direction, which is parallel with the optical axis of the photographing lens 2. More precisely, on a lower surface of the bracket 34, a pin 34a is provided which contacts with the end portion 21a of the zoom lever 21. Moreover, due to a tension spring 35 provided between the back wall 11c of the casing 11 and the light emitting portion 31 (the bracket 34), the light emitting portion 31 together with the bracket 34 is constantly biased toward the inside of the casing 11. According to the above structure of the light emitting portion 31, a position of the light emitting portion 31 is adjusted with respect to the Fresnel lens 29 by the movement of the zoom lever 21 so that a state of light collection by the Fresnel lens 29 is determined for each zooming operation. It should be noted that the strobe 8 can work as a zoom strobe.

Functioning of the strobe 8 is explained in accordance with FIGS. 4 and 5. Both drawings show the inside structure of the camera body 1 around the strobe 8, which is popped out. FIG. 4 is a front view and FIG. 5 is a plane view of the inside structure. When the main switch button 9 is pressed when the strobe 8 is retracted in the camera body 1 as shown in FIGS. 2 and 3, the shaft 9a presses the end portion 17b of the lever member 17, so that the lever member 17 starts rotating in counterclockwise direction. Then, the hook portion 17a disengages from the protrusion 16, so that the supporting plate 12 is pulled toward the right hand direction in FIG. 5 by the tension spring 15. Due to the tension spring 15, the supporting plate 12 is moved with respect to the base plate 13. The movement of the supporting plate 12 is guided by the pins 14 provided on the base plate 13, which are loosely engaged in the guide groove 12a so that the guide groove 12a (the supporting plate 12) moves with respect to the pins 14 (the base plate 13). According to this motion of the supporting plate 12, the strobe 8 is moved toward the right hand direction to pop-out from the camera body 1. The popped-out position of the strobe 8 is determined when the pin 14 comes into contact with the end of the guide groove 12a. When strobe 8 is popped-out from the camera body 1, a photographing operation of the camera is possible because, as explained, the popping-out motion of the strobe 8 makes the pin member 11a come into contact with the movable contact 20a of the contact 20 to activate the entire camera. When the system is activated, the strobe 8 is charged.

In the strobe, the pin 34a of the bracket 34 constantly contacts the end portion 21a of the zoom lever 21 due to the biasing force of the tension spring 35. When the zoom lever 21 rotates clockwise in FIG. 5, the end portion 21a pushes the bracket 34 through the pin 34a toward the front side of the camera (downward in FIG. 5) along the rail 30. Accordingly, the light emitting portion 31 is also moved toward the front side the camera. Similarly, when the zoom lever 21 is rotated counter clockwise, the light emitting portion 31 is moved toward the back side of the camera body 1 under tension from spring 35. The range of the movement of the zoom lever 21 and the light emitting portion 31 is shown in the solid line and the dotted line in FIG. 5.

When a zoom motor 28 is activated by the operation of the zoom button 10, the focal length is set by the movement of the zoom lens 2 through the reduction gear mechanism 27. At the same time, the rack 26, which meshes with the final gear 27a, moves the zoom cam plate 24 as shown with the dotted line in FIG. 4 and FIG. 5. In this case, the zoom cam plate 24 moves in the right hand direction in FIG. 4. The cam pin 23 is moved along the cam groove 25, and then the zoom lever 21 is rotated. As explained, the end portion 21a of the zoom lever 21 is constantly in contact with the pin 34a of the bracket 34 due to the spring 35, so that the light emitting portion 31 moves along the rail 30 in the forward or backward direction. Consequently, the position of the light emitting portion 31 along the rail 30 is varied with respect to the Fresnel lens 29, so that the light emitting characteristics of the strobe 8 is changed.

On the other hand, in order to retract the strobe 8 into the camera body 1, the popped-out casing 11 is pushed back into the camera body 1 by an operator. More specifically, when the strobe 8 is pushed, the supporting plate 12, which is guided by the pins 14 along the groove 12a, is pushed back against the spring 15 toward the inside of the camera body 1, i.e. the left hand direction in FIG. 5. When the supporting plate 12 is returned to the initial position, as shown in FIG. 3, the protrusion 16 engages the hook portion 17a of the lever member 17, so that the strobe 8 is held in the retracted position. During the retraction of the strobe 8, due to the spring 35, the pin 34a of the bracket 34 remains in contact with a front edge 21b of the zoom lever 21. When the supporting plate 12 is at the initial position, the light emitting portion 31 is positioned at the frontmost position in the strobe 8.

As explained above, the strobe 8 is arranged to pop-out from the shorter side surface of a camera body having a rectangular body. According to the strobe 8 being arranged to pop-out from the shorter side surface, even when the camera body is made smaller, the distance between the strobe 8 and the photographing lens 2 is longer in comparison with the total dimensions the camera body 1, which is made smaller. When a human being is photographed, the red-eye phenomenon is prevented because light emitted from the strobe 8 which is reflected by human eyes is less likely to fall directly into the photographing lens 2.

As explained in the above embodiment, even when the strobe 8 is constructed as the zoom strobe, no additional device and/or motor in the strobe 8 is necessary because the zoom strobe 8 is driven by the zooming mechanism of the zoom photographing lens 2. The zoom strobe 8 is thus less complicated than the prior art. As a result, the zoom strobe 8 can be applied to a small type camera, which has been designed for the purpose of attaining light-weight and smaller size body.

As the light emitting portion 31 is moved in accordance with the zooming operation of the zoom photographing lens 2, in particular, when photographing with a long focal length, the illuminating angle of the strobe 8 is made narrower. In other words, a guide number (GNo.) of the strobe 8 is, as a result, made larger. Even when a guide number(GNo.) is made longer, due to the distance between the strobe 8 and the zoom photographing lens 2, the red-eye phenomenon is effectively prevented.

In the preferred embodiment, the zoom cam plate 24 is provided to rotate the zoom lever 21 in the horizontal plane as shown in the drawings. Depending on a relative position between the strobe 8 and the lens 2, it is also possible to rotate the zoom lever 21 by a driving ring provided in the lens for the purpose of zooming operation. By utilizing the driving ring, the zoom cam plate 24 and the rack 26 are eliminated, so that the entire structure is simplified. In addition, when this strobe structure is applied to a manual zoom camera, the motor and the reduction gear mechanism are all unnecessary.

In the preferred embodiment, the main switch button 9 functions as the strobe pop-out button. On the other hand, when an exclusive switch for the strobe pop-out, separate from the main switch button, is provided, in the popped-out condition of the strobe 8, power can be separately applied to the strobe 8 through a contact switch. Furthermore, by the contact switch, the pop-out/retracted state of the strobe 8 can be detected. The information obtained through the contact switch 8 can be used as a strobe position information in a control circuit in the camera body.

A feature of the embodiment of the present invention is for the strobe to pop-out from the vertical side of the substantial rectangle camera body in which the horizontal side is longer than the vertical side. According to this structure, the optical axis of the strobe and that of the photographing lens is longer than the total dimension of the camera body, so that reflection of light from human eyes are less likely to fall into the photographing lens. As a result, the red-eye phenomenon can be prevented. In other words, the effects of the embodiment are apparent, if the camera with the strobe to which the present invention is applied is compared with a prior art camera in which a strobe is fixedly installed in the vicinity of the photographing lens.

Furthermore, if the strobe is made as the zoom strobe, even when the strobe device is made smaller according to the camera body to be made smaller, a guide number (GNo.) is substantially made larger by zooming operation. A photographing operation with the strobe at a long distance can be performed.

In front of the light emitting portion of the strobe, a lens to converge the light emitted from the light emitting portion is provided. The light emitting portion and the lens are arranged to move relatively in the direction of the optical axis of the lens. As the camera is provided with means for moving the light emitting portion in accordance with the zooming operation of the photographing lens when the strobe is in the popped-out position, there is no need to provide an exclusive zooming mechanism in the strobe, which can make the entire strobe device smaller.

The strobe is integrally provided with the supporting plate, which can reciprocally move in the pop-out and retracting directions. The supporting plate is biased by the spring means toward the pop-out direction, and the supporting plate is manual-releasably held against the spring means. In addition, when the supporting plate (the strobe) is moved toward the pop-out direction, the main power switch is turned on. Consequently, both the pop-out mechanism and the switch structure can be obtained by a simple structure, which can contribute to a smaller size camera with a smaller strobe device.

I claim:

1. A lens shutter type of camera with a retractable strobe device, said camera comprising:
    a camera body having a rectangular solid shape having longer side surfaces and shorter side surfaces between front and back surfaces;
    a photographing optical system including a zoom photographing lens;
    means for popping-out said retractable strobe from said camera body to an operative position;
    a driving mechanism of said zoom photographing lens for performing a zooming operations;
    means for varying an illuminating angle of said retractable strobe device, said illuminating angle varying means including a driving member being disposed to be driven in accordance with said driving mechanism of said zoom photographing lens, and a zoom lever pivotally mounted on a predetermined stationary portion of said camera body and engaging said driving member such that said zoom lever rotates in a plane parallel with said longer side surfaces;
    said popping-out means and said illuminating angle varying means are disposed so that said retractable strobe device pops-out from one of shorter said side surfaces of said camera; and
    said zoom lever being arranged to contact said popping-out means so that said zoom lever moves to vary an illumination angle of said strobe device in accordance with said driving mechanism of said zoom photographing lens only when said retractable strobe device is in said operative position.

2. The lens shutter type of camera with the retractable strobe device according to claim 1, wherein said zoom lever includes at least one pin to engage said driving member so that said zoom lever rotates with respect to a pivot point of said zoom lever when said driving member moves in accordance with said driving mechanism of said zoom photographing lens.

3. The lens shutter type of camera with the retractable strobe device according to claim 2, wherein said driving member comprises: a driving plate arranged to move in a plane parallel with said longer side surfaces of said camera, said driving plate having a groove to guide said at least one pin provided on said zoom lever, wherein a total rotational angle of said zoom lever is determined by a driving distance of said driving plate, a length of said groove, an angle of said groove with respect to direction of movement of said driving plate, and a length of said zoom lever.

4. The lens shutter type of camera with the retractable strobe device according to claim 3, wherein said driving plate is provided with a rack portion to engage a final gear of a reduction gear train in said driving mechanism of said zoom photographing lens.

5. The lens shutter type of camera with the retractable strobe device according to claim 2, wherein said retractable strobe device includes a casing to which a Fresnel lens is fixedly provided, a light emitting portion including a light source and a reflector, said casing containing said light emitting portion, and is connected with said strobe popping-out means, and said light emitting portion is connected with said illuminating angle varying means.

6. The lens shutter type of camera with the retractable strobe device according to claim 5, wherein said zoom lever is disposed in said casing regardless of the position of said casing.

7. The lens shutter type of camera with the retracted strobe device according to claim 6, wherein said zoom lever is contained in said camera body regardless of the position of said retractable strobe device.

8. The lens shutter type of camera with the retractable strobe device according to claim 2, wherein a portion of said zoom lever which contacts said zoom popping-out means, is a free end of said zoom lever.

9. A lens shutter type of camera with a retractable strobe device, said camera comprising:
    a camera body;
    a photographing optical system including a zoom photographing lens;
    means for popping-out said retractable strobe from said camera body to an operative position;
    a driving mechanism of said zoom photographing lens in accordance with a zooming operation; and
    means for varying an illuminating angle of said retractable strobe device, said illuminating angle varying means including a driving member being disposed to be driven in accordance with said driving mechanism of said zoom photographing lens, and a zoom lever being pivotable on a predetermined stationary portion of said camera body and engaging said driving member;
    said popping-out means and said illuminating angle varying means being disposed so that said retractable strobe device pops-out in the film winding direction; and
    said zoom lever being disposed to contact said popping-out means so that said zoom lever moves to vary an illumination angle of said strobe device in accordance with said driving mechanism of said zoom photographing lens only when said retractable strobe device is in said operative position.

10. The lens shutter type of camera with the retractable strobe device according to claim 9, wherein said zoom lever is provided with a pin to engage said driving member so that said zoom lever rotates with respect to a pivot point of said zoom lever when said driving member moves in accordance with said driving mechanism of said zoom photographing lens.

11. The lens shutter type of camera with the retractable strobe device according to claim 10, wherein said driving member comprises a driving plate, said driving plate being disposed to move in a plane parallel with said longer side surfaces of said camera, said driving plate having a groove to guide said pin such that a total rotational angle of said zoom lever is determined by a driving distance of said driving plate, a length of said groove, an angle of said groove with respect to a direction of said driving plate, and a length of said zoom lever.

12. The lens shutter type of camera with the retractable strobe device according to claim 11, wherein said driving plate includes a rack portion to engage a final gear of a reduction gear train in said driving mechanism of said zoom photographing lens.

13. The lens shutter type of camera with the retractable strobe device according to claim 10, wherein said retractable strobe device comprises a casing to which a Fresnel lens is fixedly provided, a light emitting portion including a light source and a reflector, said casing containing said light emitting portion, and is connected with said strobe popping-out means, and said light emitting portion is connected with said illuminating angle varying means.

14. The lens shutter type of camera with the retractable strobe device according to claim 12, wherein said zoom lever is disposed in said casing regardless of the position of said casing.

15. The lens shutter type of camera with the retracted strobe device according to claim 14, wherein said zoom lever disposed in said camera body regardless of the position of said retractable strobe device.

16. The lens shutter type of camera with the retractable strobe device according to claim 10, wherein a portion of said zoom lever, which contact said zoom popping-out means, is a free end of said zoom lever.

* * * * *